(12) United States Patent
Osagawa

(10) Patent No.: US 10,243,755 B2
(45) Date of Patent: Mar. 26, 2019

(54) COMMUNICATION DEVICE AND COMMUNICATION METHOD

(71) Applicant: Mitsubishi Electric Corporation, Tokyo (JP)

(72) Inventor: Daisuke Osagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/522,135

(22) PCT Filed: Mar. 25, 2015

(86) PCT No.: PCT/JP2015/059198
§ 371 (c)(1),
(2) Date: Apr. 26, 2017

(87) PCT Pub. No.: WO2016/151811
PCT Pub. Date: Sep. 29, 2016

(65) Prior Publication Data
US 2017/0331636 A1    Nov. 16, 2017

(51) Int. Cl.
*H04L 12/28* (2006.01)
*H04W 28/04* (2009.01)
(Continued)

(52) U.S. Cl.
CPC .......... *H04L 12/28* (2013.01); *H04L 1/0083* (2013.01); *H04L 1/20* (2013.01); *H04W 28/04* (2013.01);
(Continued)

(58) Field of Classification Search
CPC .......... H04L 12/28; H04L 1/20; H04W 28/04
See application file for complete search history.

(56) References Cited

U.S. PATENT DOCUMENTS

2002/0026523 A1*  2/2002  Mallory .............. H04L 1/0003
                                                  709/236
2004/0090960 A1*  5/2004  Holma ................ H04L 29/06
                                                  370/392
(Continued)

FOREIGN PATENT DOCUMENTS

EP      1 748 338 B1      3/2011
JP      2000349768 A     12/2000
(Continued)

OTHER PUBLICATIONS

Communication dated Jun. 7, 2016, from the Japanese Patent Office in counterpart Japanese application No. 2016-514773.
(Continued)

*Primary Examiner* — Asad M Nawaz
*Assistant Examiner* — Berhanu D Belete
(74) *Attorney, Agent, or Firm* — Sughrue Mion, PLLC; Richard C. Turner

(57) ABSTRACT

A communication device which has a frame reception unit to separate a frame received from one device into a relay sub-payload that is not addressed to the device itself, and an own-device addressed sub-payload that is addressed to the device itself, an error detection unit to perform error detection based on the error-detection code within the own-device addressed sub-payload, a relay sub-payload storage unit to store the relay sub-payload, a communication-start notification unit to notify a communication-start timing to start communication simultaneously with other devices, and a frame transmission unit to start transmitting to another device the frame including a preamble and the relay sub-payload upon being notified of the communication-start timing, and to add the relay sub-payload to an end of the frame currently being transmitted, so as to continue trans-
(Continued)

mission of the frame, when the relay sub-payload is stored in the relay sub-payload storage unit.

5 Claims, 7 Drawing Sheets

(51) Int. Cl.
*H04L 1/20* (2006.01)
*H04L 1/00* (2006.01)
(52) U.S. Cl.
CPC .... *H04L 1/0061* (2013.01); *H04L 2001/0097* (2013.01)

(56) References Cited

U.S. PATENT DOCUMENTS

| | | | |
|---|---|---|---|
| 2005/0030965 A1* | 2/2005 | Aoki | H04L 12/18 370/432 |
| 2005/0111451 A1* | 5/2005 | Kim | H04L 1/0061 370/389 |
| 2007/0058682 A1 | 3/2007 | Albrecht et al. | |
| 2007/0079208 A1* | 4/2007 | Shvodian | H04L 1/1607 714/749 |
| 2007/0140303 A1* | 6/2007 | Kim | B61L 27/0088 370/503 |
| 2008/0123723 A1 | 5/2008 | Aoyama et al. | |
| 2009/0019129 A1* | 1/2009 | Suzuki | H04N 5/23203 709/208 |
| 2010/0254407 A1* | 10/2010 | Tanaka | H04J 3/1694 370/468 |
| 2011/0085547 A1* | 4/2011 | Takada | H04L 12/4625 370/389 |
| 2013/0170459 A1* | 7/2013 | Naito | H04W 8/005 370/329 |
| 2013/0318406 A1* | 11/2013 | Washio | G08C 25/00 714/715 |
| 2015/0023201 A1* | 1/2015 | Yanagidate | H01Q 3/30 370/252 |

FOREIGN PATENT DOCUMENTS

| | | |
|---|---|---|
| JP | 2005057373 A | 3/2005 |
| JP | 2008135855 A | 6/2008 |
| JP | 2009021700 A | 1/2009 |
| JP | 2010021806 A | 1/2010 |
| JP | 2011160018 A | 8/2011 |
| JP | 2012005042 A | 1/2012 |

OTHER PUBLICATIONS

Communication dated Oct. 2, 2018 issued by the Intellectual Property Office of Taiwan in counterpart Taiwanese application No. 106133390.

\* cited by examiner

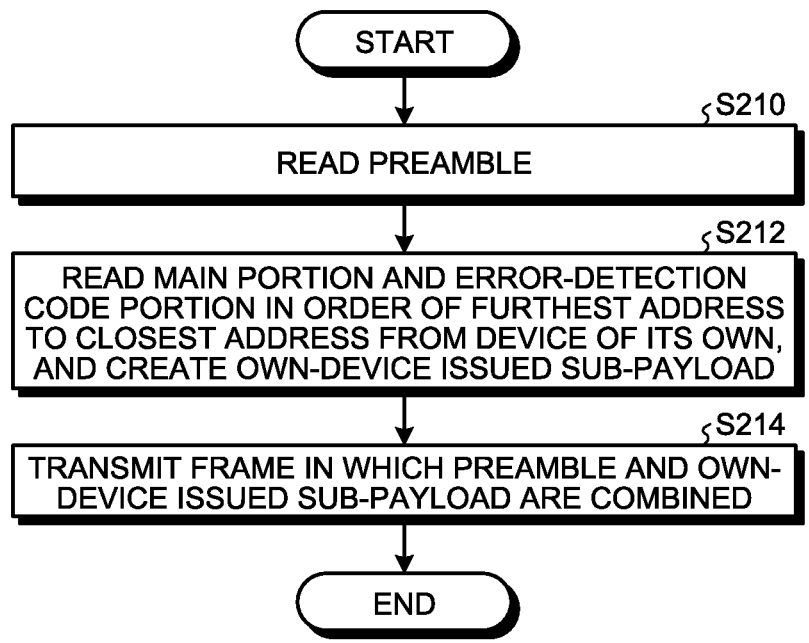
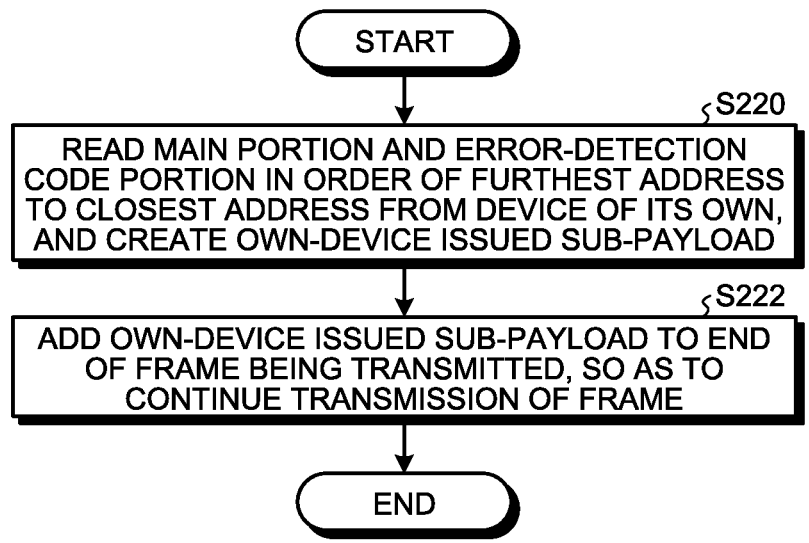

COMMUNICATION DEVICE AND COMMUNICATION METHOD

CROSS REFERENCE TO RELATED APPLICATIONS

This application is a National Stage of International Application No. PCT/JP2015/059198 filed Mar. 25, 2015, the contents of all of which are incorporated herein by reference in their entirety.

FIELD

The present invention relates to a communication device and a communication method.

BACKGROUND

In an FA (factory automation) network system, for the purpose of wire-saving, a single master device and a plurality of slave devices are connected with a daisy chain in some cases. In the system with a daisy-chain connection, communication between a first device and a second device that are not adjacent to each other is performed by relaying the communication by a device positioned between the first device and the second device.

The master device and the slave devices communicate with each other repeatedly in the same cycle. The mater device transmits command data to the slave devices. The slave devices transmit response data to the master device. As the communication time of the command data and the response data becomes shorter, the master device and the slave devices can exchange these command data and response data more closely and frequently. Therefore, the system can improve the control accuracy.

As a method for reducing the communication time, it is common to reduce the volume of communication data, or reduce the number of frames needed for communication. In the method for reducing the number of frames needed for communication, the volume of data needed for each frame can be reduced. Therefore, the communication time is reduced. As the data needed for each frame, a preamble that indicates the start of a frame, or a frame check sequence (FCS) that is a code to be added for performing error detection and correction on the frame, is exemplified.

As a related technique, Patent Literature 1 has described a communication system in which a master node and a plurality of terminal nodes are connected with a daisy chain. In this system, each of the terminal nodes relays and forwards the control data, transmitted from the master node, to the subsequent downstream node after the terminal node deletes a command field for its own node in the control data, and then shifts the second and subsequent command fields one by one to shorten the control data (paragraph [0029]).

Further, Patent Literature 2 has described a system in which a controller and a plurality of servo amplifiers are connected in a line. In this system, each of the amplifiers receives a frame from a higher amplifier, which includes command-data areas transmitted from the controller to the amplifiers, and then transmits the frame, from which a command-data area addressed to the amplifier of its own has been removed, to a lower amplifier (paragraphs [0039] to [0040]).

Furthermore, Patent Literature 3 has described a system in which a numerical control device and a plurality of amplifiers are connected with a daisy chain. In this system, each of the amplifiers transmits a transmission-start code to an upstream amplifier, and then transmits its own amplifier data, and subsequently the downstream amplifier data, received from the downstream amplifier, to the upstream amplifier (paragraph [0013]). When each of the amplifiers cannot receive the downstream amplifier data before it has completely transmitted its own amplifier data, the amplifier transmits idle-time data to the upstream amplifier after the transmission of its own amplifier data and until the reception of the amplifier data from the downstream amplifier, and thereafter transmits this downstream amplifier data to the upstream amplifier (paragraph [0028]).

CITATION LIST

Patent Literatures

Patent Literature 1: Japanese Patent Application Laid-open No. 2009-21700
Patent Literature 2: Japanese Patent Application Laid-open No. 2011-160018
Patent Literature 3: Japanese Patent Application Laid-open No. 2008-135855

SUMMARY

Technical Problem

According to the techniques described in Patent Literatures 1 and 2, because the frame size is reduced, the communication time can be reduced. However, in these techniques described in Patent Literatures 1 and 2, each device removes the data addressed to the device of its own, from the frame received from the upstream device. Therefore, the contents and the length of the frame are changed. However, these techniques described in Patent Literatures 1 and 2 do not consider error detection in a frame obtained after each device has removed the data addressed to the device of its own, from the frame received from the upstream device. Therefore, in the techniques described in Patent Literatures 1 and 2, the system cannot detect a data error attributable to a transmission error, and accordingly may not be capable of executing a normal control.

Further, in the technique described in Patent Literature 3, because the idle-time data is transmitted, this makes the communication time longer. Furthermore, in the technique described in Patent Literature 3, each of the amplifiers transmits its own amplifier data, and subsequently the idle-time data and the downstream amplifier data. However, the technique described in Patent Literature 3 does not consider error detection in the own amplifier data, the idle-time data, or the downstream amplifier data. Therefore, in the technique described in Patent Literature 3, the system cannot detect a data error attributable to a transmission error, and accordingly may not be capable of executing a normal control.

The present invention has been achieved to solve the above problems, and an object of the present invention is to provide a communication device that can reduce the communication time and perform error detection.

Solution to Problem

In order to solve the above-mentioned problems and achieve the object, there is provided a communication device to transmit and receive a frame including a preamble and a payload, where the payload includes one or a plurality of sub-payloads, each of which includes a main portion including an address portion for storing therein a value that indicates a target-address device, a data portion for storing therein data to be transmitted to the target-address device, and a data-length portion for storing therein a value that indicates a length of the data portion, and an error-detection code portion for storing therein an error-detection code for performing error detection attributable to a transmission error, the communication device including: a frame reception unit to separate the frame received from one device into a relay sub-payload that is the sub-payload not addressed to a device of its own, and an own-device addressed sub-payload that is the sub-payload addressed to a device of its own; an error detection unit to perform error detection on the own-device addressed sub-payload based on the error-detection code within the own-device addressed sub-payload; a relay sub-payload storage unit to store therein the relay sub-payload; a communication-start notification unit to notify a communication-start timing to start communication simultaneously with other devices; and a frame transmission unit to start transmitting to another device the frame including the preamble and the relay sub-payload upon being notified of the communication-start timing, when the frame is not being transmitted, and to add the relay sub-payload to an end of the frame being transmitted, so as to continue transmission of the frame, when the relay sub-payload is stored in the relay sub-payload storage unit while the frame is being transmitted.

Advantageous Effects of Invention

The communication device according to the present invention has an effect where the communication device can reduce the communication time and perform error detection.

BRIEF DESCRIPTION OF DRAWINGS

FIG. 7 is a flowchart illustrating a first transmission process in the communication unit in the control device according to the first embodiment.

FIG. 8 is a flowchart illustrating a second transmission process in the communication unit in the control device according to the first embodiment.

DESCRIPTION OF EMBODIMENTS

A communication device and a communication method according to an embodiment of the present invention will be described below in detail with reference to the accompanying drawings. The present invention is not limited to the embodiment.

First Embodiment

Figure 1:
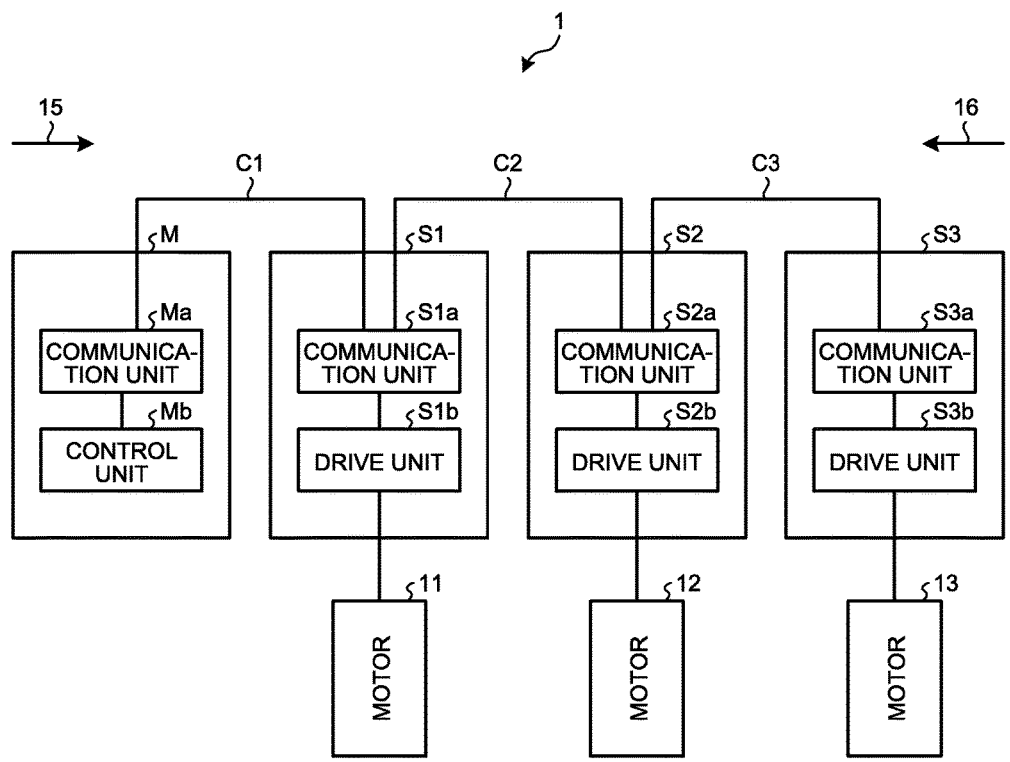
FIG. 1 is a diagram illustrating a configuration of a communication system according to a first embodiment.

FIG. 1 is a diagram illustrating a configuration of a communication system according to a first embodiment. A communication system 1 includes control devices M, S1, S2, and S3. The control device M is connected to the control device S1 through a cable C1. The control device S1 is connected to the control device S2 through a cable C2. The control device S2 is connected to the control device S3 through a cable C3. That is, the control devices M, S1, S2, and S3 are connected with a daisy chain.

The control devices M, S1, S2, and S3 have a period of performing communication in a direction of an arrow 15 from the control device M toward the control device S3, and a period of performing communication in a direction of an arrow 16 from the control device S3 toward the control device M. In the first embodiment, the direction of the arrow 15 is sometimes referred to as "downstream direction", and the direction of the arrow 16 is sometimes referred to as "upstream direction".

The respective transmission-start timings in the control devices M, S1, S2, and S3 are synchronized with each other. The control devices M, S1, S2, and S3 simultaneously start transmission in the downstream direction 15 at their transmission-start timing during the period of performing communication in the downstream direction 15. In contrast, the control devices M, S1, S2, and S3 simultaneously start transmission in the upstream direction 16 at their transmission-start timing during the period of performing communication in the upstream direction 16.

The control device M is a master control device that controls the control devices S1, S2, and S3. As the control device M, a programmable controller (JIS B 3502:2011 (PLC)) is exemplified. The control device M includes a communication unit Ma that communicates with the control devices S1, S2, and S3, and a control unit Mb that performs control calculation to control the control devices S1, S2, and S3.

The control device S1 is a slave control device that operates under control of the control device M. As the control device S1, a servo amplifier is exemplified. The control device S1 includes a communication unit S1a that communicates with the control devices M, S2, and S3, and a drive unit S1b that drives a motor 11.

The control device S2 is a slave control device that operates under control of the control device M. As the control device S2, a servo amplifier is exemplified. The control device S2 includes a communication unit S2a that communicates with the control devices M, S1, and S3, and a drive unit S2b that drives a motor 12.

The control device S3 is a slave control device that operates under control of the control device M. As the control device S3, a servo amplifier is exemplified. The control device S3 includes a communication unit S3a that communicates with the control devices M, S1, and S2, and a drive unit S3b that drives a motor 13.

Figure 2:
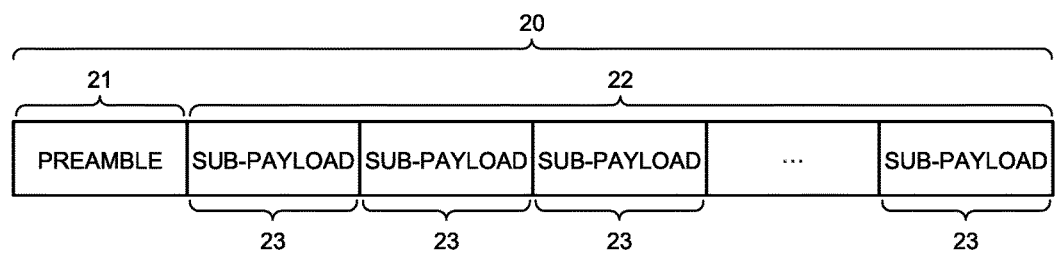
FIG. 2 is a diagram illustrating a frame to be transmitted and received in the communication system according to the first embodiment.

FIG. 2 is a diagram illustrating a frame to be transmitted and received in the communication system according to the first embodiment. A frame 20 includes a preamble 21 that is a bit sequence in a predetermined pattern, and that indicates the start of the frame 20, and a payload 22 in which data is stored.

In the first embodiment, the payload 22 is constituted by one or a plurality of blocks. In the first embodiment, the one block that constitutes the payload 22, or the blocks that constitute the payload 22 are referred to as "sub-payload 23".

Figure 3:
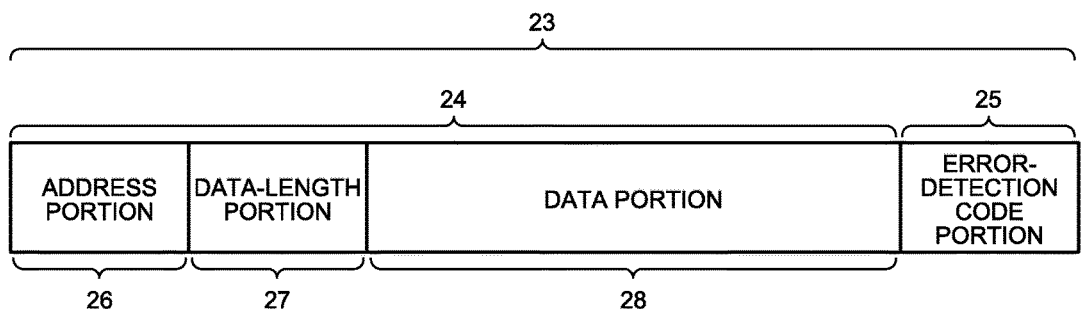
FIG. 3 is a diagram illustrating a sub-payload to be transmitted and received in the communication system according to the first embodiment.

FIG. 3 is a diagram illustrating a sub-payload to be transmitted and received in the communication system according to the first embodiment. The sub-payload 23 includes a main portion 24, and an error-detection code portion 25 for storing therein an error-detection code for performing error detection on the sub-payload 23 attributable to a transmission error. As the error-detection code, a check sum or a cyclic redundancy check (CRC) is exemplified. The error detection code can be an error-correction code for performing error correction in addition to the error detection. As the error-correction code, a cyclic code or a convolutional code is exemplified.

The main portion 24 includes an address portion 26, a data-length portion 27, and a data portion 28. The address portion 26 stores therein the value that indicates a device to which the sub-payload 23 is addressed. The data portion 28 stores therein the data to be transmitted to the device to which the sub-payload 23 is addressed. The data-length portion 27 stores therein the value that indicates the length of the data portion 28. The sub-payload 23 is a unit of the signal to be addressed to a certain device.

Each of the address portion 26, the data-length portion 27, and the error-detection code portion 25 is fixed in length, while the data portion 28 is variable in length. The length of the data portion 28 is stored in the data-length portion 27. Therefore, by referring to the data-length portion 27, the communication units Ma, S1a, S2a, and S3a can obtain the length of the sub-payload 23.

Referring back to FIG. 2, the payload 22 includes one or a plurality of sub-payloads 23. It is possible that the one sub-payload 23 included in a single payload 22, or the sub-payloads 23 included in a single payload 22 have a target address identical to or different from each other.

Figure 4:
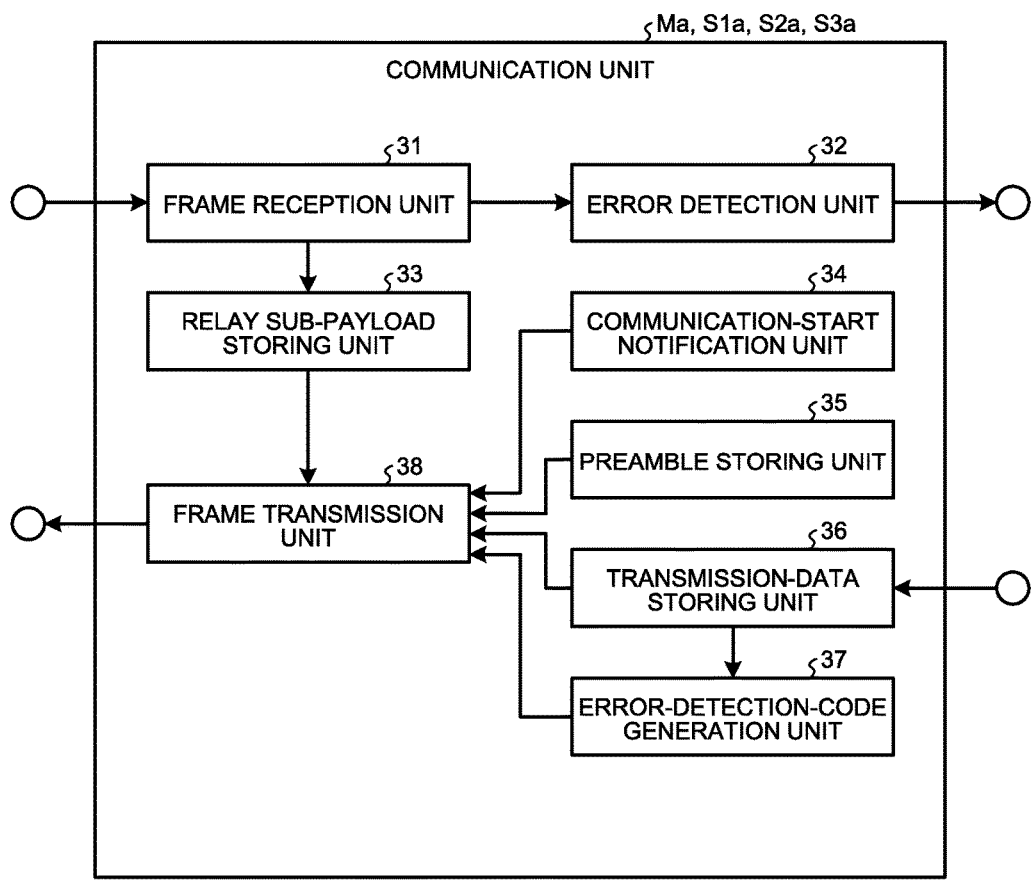
FIG. 4 is a diagram illustrating a configuration of a communication unit in a control device according to the first embodiment.

FIG. 4 is a diagram illustrating a configuration of the communication unit in the control device according to the first embodiment. In the first embodiment, the communication units Ma, S1a, S2a, and S3a have an identical configuration.

Each of the communication units Ma, S1a, S2a, and S3a includes a frame reception unit 31 that separates the frame 20 received from one device into a relay sub-payload 23 and an own-device addressed sub-payload 23. The relay sub-payload 23 is a sub-payload that is not addressed to the device of its own. The own-device addressed sub-payload 23 is a sub-payload that is addressed to the device of its own.

The frame reception unit 31 stores one or a plurality of relay sub-payloads 23 in a relay sub-payload storage unit 33.

Each of the communication units Ma, S1a, S2a, and S3a includes an error detection unit 32 that performs error detection on the own-device addressed sub-payload 23 based on an error-detection code within the own-device addressed sub-payload 23. The error detection unit 32 transmits a result of the error detection, and the main portion 24 within the own-device addressed sub-payload 23, to the control unit Mb, or to the drive unit S1b, S2b, or S3b.

Each of the communication units Ma, S1a, S2a, and S3a includes the relay sub-payload storage unit 33 that stores therein the relay sub-payload 23.

Each of the communication units Ma, S1a, S2a, and S3a includes a communication-start notification unit 34 that notifies the communication-start timing to start communication simultaneously with other devices.

Each of the communication units Ma, S1a, S2a, and S3a includes a preamble storage unit 35 that stores therein the preamble 21.

Each of the communication units Ma, S1a, S2a, and S3a includes a transmission-data storage unit 36 that stores therein the main portion 24 created by the control unit Mb or the drive unit S1b, S2b, or S3b of the device of its own.

It is preferable for the control unit Mb or the drive unit S1b, S2b, or S3b to store one or a plurality of main portions 24 in the transmission-data storage unit 36 in the order of the furthest address to the closest address from the device of its own. Due to this operation, only by reading the data in the transmission-data storage unit 36 sequentially from the beginning, a frame transmission unit 38 can create an own-device issued sub-payload 23 that is issued by the device of its own to another device in the order of the furthest address to the closest address from the device of its own.

Each of the control devices M, S1, S2, and S3 transmits the frame 20 in which the own-device issued sub-payloads 23 are combined in the order of the furthest address to the closest address from the device of its own. Therefore, the following effects are obtained.

It is assumed that the control device M transmits to the control device S1 the frame 20 in which the own-device issued sub-payload 23 addressed to the control device S1, the own-device issued sub-payload 23 addressed to the control device S3, and the own-device issued sub-payload 23 addressed to the control device S2, are combined in the described order. Under this assumption, the control device S1 cannot immediately transmit the relay sub-payload 23 addressed to the control device S3. That is, the control device S1 cannot start transmitting the relay sub-payload 23 addressed to the control device S3 until the control device S1 has received this relay sub-payload 23. Therefore, completion of the communication among the control devices M, S1, S2, and S3 is delayed, and this increases the communication time.

Meanwhile, the control device M transmits to the control device S1 the frame 20 in which the own-device issued sub-payload 23 addressed to the control device S3, the own-device issued sub-payload 23 addressed to the control device S2, and the own-device issued sub-payload 23 addressed to the control device S1 are combined in the described order.

Therefore, upon receiving the relay sub-payload 23 issued by the control device M and addressed to the control device S3, the control device S1 can transmit to the control device S2 this relay sub-payload 23 issued by the control device M and addressed to the control device S3. Due to this operation, the completion of the communication among the control devices M, S1, S2, and S3 can be advanced forward, and this can reduce the communication time.

Each of the communication units Ma, S1a, S2a, and S3a includes an error-detection-code generation unit 37 that generates the error-detection code portion 25 to be added to the main portion 24. After the main portion 24 is stored in the transmission-data storage unit 36, the error-detection-code generation unit 37 refers to the stored main portion 24 to generate the error-detection code portion 25.

Each of the communication units Ma, S1a, S2a, and S3a includes the frame transmission unit 38. When the frame transmission unit 38 is notified of the communication-start timing, and when the frame 20 is not being transmitted, this frame transmission unit 38 starts transmitting to another device the frame 20 including the preamble 21 and the relay sub-payload 23. When the relay sub-payload 23 is stored in the relay sub-payload storage unit 33 while the frame 20 is being transmitted, the frame transmission unit 38 adds this relay sub-payload 23 to the end of the frame 20 being transmitted, so as to continue the transmission of the frame 20.

Figure 5:
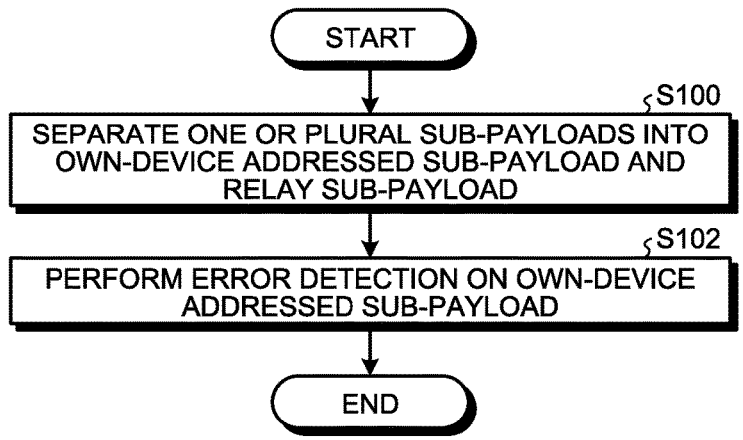
FIG. 5 is a flowchart illustrating processing at the time of reception in the communication unit in the control device according to the first embodiment.

FIG. 5 is a flowchart illustrating processing at the time of reception in the communication unit in the control device according to the first embodiment. At Step S100, the frame reception unit 31 separates one or a plurality of sub-payloads 23 within the payload 22 of a received frame 20 into the own-device addressed sub-payload 23 that is addressed to the device of its own, and the relay sub-payload 23 that is not addressed to the device of its own.

By referring to the address portion 26 of the one sub-payload 23 or each of the sub-payloads 23, the frame reception unit 31 can obtain a target address of the one sub-payload 23 or each of the sub-payloads 23. Further, by referring to the data-length portion 27 of the one sub-payload 23 or each of the sub-payloads 23, the frame reception unit 31 can obtain the length of the one sub-payload 23 or each of the sub-payloads 23.

Therefore, based on the address portion 26 and the data-length portion 27 of the one sub-payload 23 or the sub-payloads 23, the frame reception unit 31 can separate the one sub-payload 23 or the sub-payloads 23 into the own-device addressed sub-payload 23 and the relay sub-payload 23. The frame reception unit 31 transmits the own-device addressed sub-payload 23 to the error detection unit 32, and stores the relay sub-payload 23 in the relay sub-payload storage unit 33.

Each of the control devices M, S1, S2, and S3 transmits the frame 20 in which the own-device issued sub-payloads 23 are combined in the order of the furthest address to the closest address from the device of its own. Therefore, the following effects are obtained.

It is assumed that the control device M transmits to the control device S1 the frame 20 in which the own-device issued sub-payload 23 addressed to the control device S1, the own-device issued sub-payload 23 addressed to the control device S3, and the own-device issued sub-payload 23 addressed to the control device S2, are combined in the described order. Under this assumption, the control device S1 cannot immediately transmit the relay sub-payload 23 addressed to the control device S3. That is, the control device S1 cannot start transmitting the relay sub-payload 23 addressed to the control device S3 until the control device S1 has received this relay sub-payload 23. Therefore, completion of the communication among the control devices M, S1, S2, and S3 is delayed, and this increases the communication time.

Meanwhile, the control device M transmits to the control device S1 the frame 20 in which the own-device issued sub-payload 23 addressed to the control device S3, the own-device issued sub-payload 23 addressed to the control device S2, and the own-device issued sub-payload 23 addressed to the control device S1 are combined in the described order.

Therefore, upon receiving the relay sub-payload 23 issued by the control device M and addressed to the control device S3, the control device S1 can transmit to the control device S2 this relay sub-payload 23 issued by the control device M and addressed to the control device S3. Due to this operation, the completion of the communication among the control devices M, S1, S2, and S3 can be advanced forward, and this can reduce the communication time.

At Step S102, the error detection unit 32 performs error detection on the own-device addressed sub-payload 23. The error detection unit 32 transmits a result of the error detection, and the main portion 24 within the own-device addressed sub-payload 23, to the control unit Mb, or to the drive unit S1b, S2b, or S3b.

Figure 6:
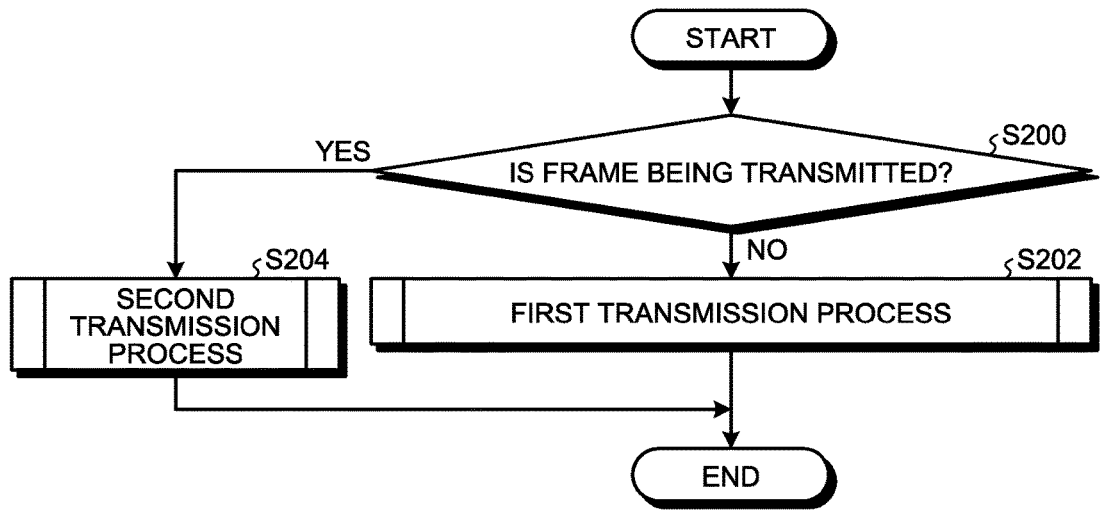
FIG. 6 is a flowchart illustrating processing at the time of transmission in the communication unit in the control device according to the first embodiment.

FIG. 6 is a flowchart illustrating processing at the time of transmission in the communication unit in the control device according to the first embodiment. The flowchart in FIG. 6 illustrates the processing at the time of transmission in the communication units Ma, S1a, S2a, and S3a in the control devices M, S1, S2, and S3 when each of the control devices M, S1, S2, and S3 transmits the own-device issued sub-payload 23 issued by the device of its own to another device.

Upon receiving a notification of the communication-start timing from the communication-start notification unit 34, the frame transmission unit 38 performs the processing illustrated in FIG. 6 if the main portion 24 has been stored in the transmission-data storage unit 36.

At Step S200, the frame transmission unit 38 determines whether the frame 20 is being transmitted. When the frame transmission unit 38 determines that the frame 20 is not being transmitted at Step S200 (NO), the frame transmission unit 38 advances the process to Step S202. When the frame transmission unit 38 determines that the frame 20 is being transmitted at Step S200 (YES), the frame transmission unit 38 advances the process to Step S204.

It is also possible that the frame transmission unit 38 determines whether the frame 20 is being transmitted, based on the remaining length of the sub-payload 23 being transmitted. The frame transmission unit 38 reads the main portion 24 from the transmission-data storage unit 36, and reads the error-detection code portion 25 from the error-detection-code generation unit 37, to create the own-device issued sub-payload 23. The processing time required for the frame transmission unit 38 to create the own-device issued sub-payload 23 is represented as T0. When a transmission remaining time T1 is longer than the processing time T0, where the transmission remaining time T1 is obtained by dividing the remaining length of the sub-payload 23 being transmitted by a predetermined communication speed, the frame transmission unit 38 can determine that the frame 20 is being transmitted. Due to this operation, the frame transmission unit 38 can determine that the frame 20 is being transmitted, taking into account the processing time required to create the own-device issued sub-payload 23.

It is also possible that the frame transmission unit 38 determines whether the frame 20 is being transmitted, based on the transmission-start time-point and the length of the sub-payload 23 being transmitted. The frame transmission unit 38 can determine that the frame 20 is being transmitted when a scheduled transmission-completion time-point T4 is later than the time-point obtained by adding the processing time T0 to the present time-point, where the scheduled transmission-completion time-point T4 is obtained by adding a transmission time T2 to a transmission-start time-point T3 for the sub-payload 23 being transmitted, and where the transmission time T2 is obtained by dividing the length of the sub-payload 23 being transmitted by the communication speed. Due to this operation, the frame transmission unit 38 can determine that the frame 20 is being transmitted, taking into account the processing time required to create the own-device issued sub-payload 23.

At Step S202, the frame transmission unit 38 performs a first transmission-process sub-routine.

FIG. 7 is a flowchart illustrating a first transmission process in the communication unit in the control device according to the first embodiment.

At Step S210, the frame transmission unit 38 reads the preamble 21 from the preamble storage unit 35.

At Step S212, the frame transmission unit 38 reads one or a plurality of main portions 24 from the transmission-data storage unit 36, and reads one or a plurality of error-detection code portions 25 from the error-detection-code generation unit 37, sequentially in the order of the furthest address to the closest address from the device of its own. The frame transmission unit 38 then creates one or a plurality of own-device issued sub-payloads 23 in the order of the furthest address to the closest address from the device of its own.

It is preferable for the control unit Mb or the drive unit S1b, S2b, or S3b to store one or a plurality of main portions 24 in the transmission-data storage unit 36 in the order of the furthest address to the closest address from the device of its own. Due to this operation, only by reading the data in the transmission-data storage unit 36 sequentially from the beginning, the frame transmission unit 38 can create the own-device issued sub-payload 23 that is issued by the device of its own to another device in the order of the furthest address to the closest address from the device of its own.

Each of the control devices M, S1, S2, and S3 transmits the frame 20 in which the own-device issued sub-payloads 23 are combined in the order of the furthest address to the closest address from the device of its own. Therefore, the following effects are obtained.

It is assumed that the control device M transmits to the control device S1 the frame 20 in which the own-device issued sub-payload 23 addressed to the control device S1, the own-device issued sub-payload 23 addressed to the control device S3, and the own-device issued sub-payload 23 addressed to the control device S2, are combined in the described order. Under this assumption, the control device S1 cannot immediately transmit the relay sub-payload 23 addressed to the control device S3. That is, the control device S1 cannot start transmitting the relay sub-payload 23 addressed to the control device S3 until the control device S1 has received this relay sub-payload 23. Therefore, completion of the communication among the control devices M, S1, S2, and S3 is delayed, and this increases the communication time.

Meanwhile, the control device M transmits to the control device S1 the frame 20 in which the own-device issued sub-payload 23 addressed to the control device S3, the own-device issued sub-payload 23 addressed to the control device S2, and the own-device issued sub-payload 23 addressed to the control device S1 are combined in the described order.

Therefore, upon receiving the relay sub-payload 23 issued by the control device M and addressed to the control device S3, the control device S1 can transmit to the control device S2 this relay sub-payload 23 issued by the control device M and addressed to the control device S3. Due to this operation, the completion of the communication among the control devices M, S1, S2, and S3 can be advanced forward, and this can reduce the communication time.

At Step S214, the frame transmission unit 38 transmits the frame 20 in which the preamble 21 is combined with one or a plurality of own-device issued sub-payloads 23 in the order of the furthest address to the closest address from the device of its own.

Referring back to FIG. 6, the frame transmission unit 38 performs a second transmission-process sub-routine at Step S204.

FIG. 8 is a flowchart illustrating a second transmission process in the communication unit in the control device according to the first embodiment.

At Step S220, the frame transmission unit 38 reads one or a plurality of main portions 24 from the transmission-data storage unit 36, and reads one or a plurality of error-detection code portions 25 from the error-detection-code generation unit 37, sequentially in the order of the furthest address to the closest address from the device of its own. The frame transmission unit 38 then creates one or a plurality of own-device issued sub-payloads 23 in the order of the furthest address to the closest address from the device of its own.

At Step S222, the frame transmission unit 38 adds one or a plurality of own-device issued sub-payloads 23 to the end of the frame 20 being transmitted in the order of the furthest address to the closest address from the device of its own, so as to continue the transmission of the frame 20. This increases the length of the frame 20 being transmitted.

Figure 9:
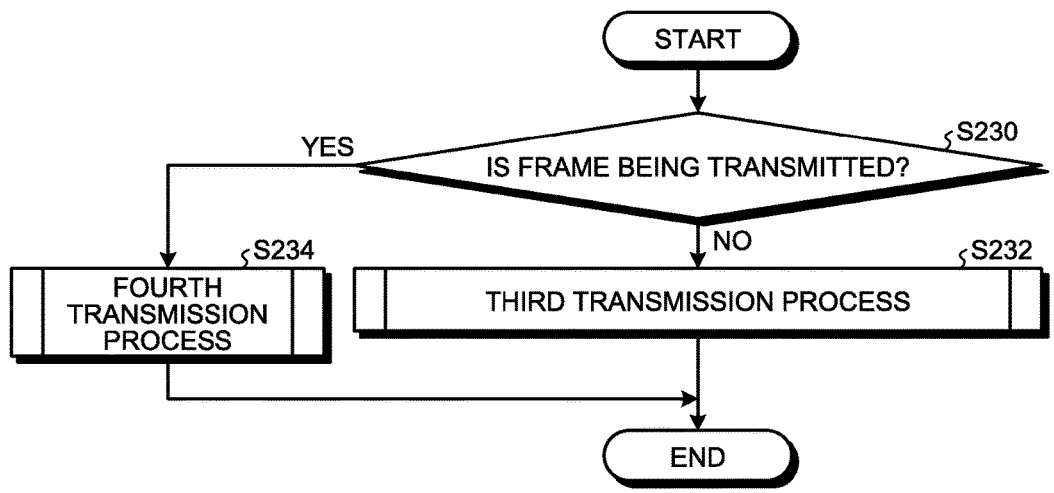
FIG. 9 is a flowchart illustrating processing at the time of transmission in the communication unit in the control device according to the first embodiment.

FIG. 9 is a flowchart illustrating processing at the time of transmission in the communication unit in the control device according to the first embodiment. The flowchart in FIG. 9 illustrates the processing at the time of transmission in the communication units Ma, S1a, S2a, and S3a in the control devices M, S1, S2, and S3 when each of the control devices M, S1, S2, and S3 forwards the relay sub-payload 23.

Upon receiving a notification of the communication-start timing from the communication-start notification unit 34, the frame transmission unit 38 performs the processing illustrated in FIG. 9 if one or a plurality of relay sub-payloads 23 have been stored in the relay sub-payload storage unit 33.

At Step S230, the frame transmission unit 38 determines whether the frame 20 is being transmitted. When the frame transmission unit 38 determines that the frame 20 is not being transmitted at Step S230 (NO), the frame transmission unit 38 advances the process to Step S232. When the frame transmission unit 38 determines that the frame 20 is being transmitted at Step S230 (YES), the frame transmission unit 38 advances the process to Step S234.

At Step S232, the frame transmission unit 38 performs a third transmission-process sub-routine.

Figure 10:
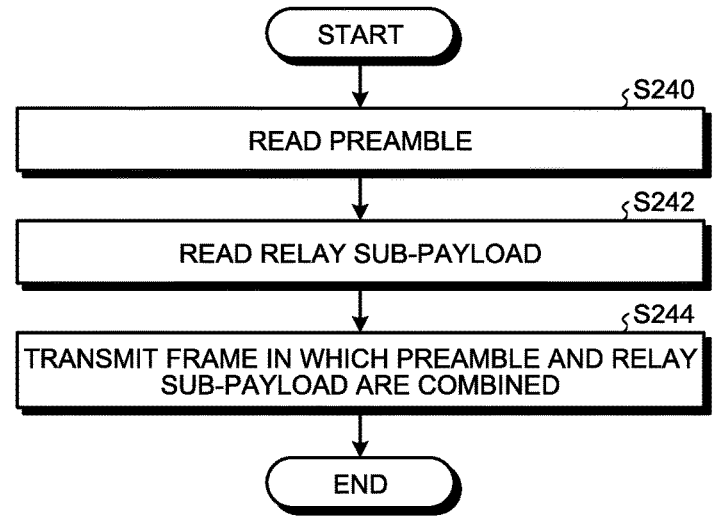
FIG. 10 is a flowchart illustrating a third transmission process in the communication unit in the control device according to the first embodiment.

FIG. 10 is a flowchart illustrating a third transmission process in the communication unit in the control device according to the first embodiment.

At Step S240, the frame transmission unit 38 reads the preamble 21 from the preamble storage unit 35.

At Step S242, the frame transmission unit 38 reads one or a plurality of relay sub-payloads 23 from the relay sub-payload storage unit 33.

At Step S244, the frame transmission unit 38 transmits the frame 20 in which the preamble 21 is combined with one or a plurality of relay sub-payloads 23 in the order of the furthest address to the closest address from the device of its own.

Referring back to FIG. 9, the frame transmission unit 38 performs a fourth transmission-process sub-routine at Step S234.

Figure 11:
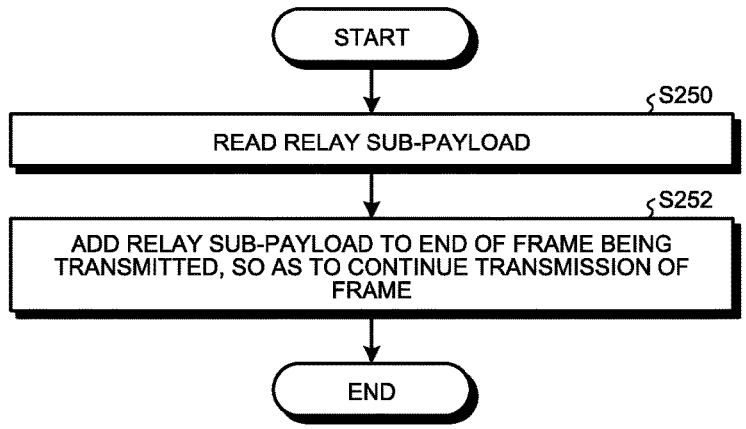
FIG. 11 is a flowchart illustrating a fourth transmission process in the communication unit in the control device according to the first embodiment.

FIG. 11 is a flowchart illustrating a fourth transmission process in the communication unit in the control device according to the first embodiment.

At Step S250, the frame transmission unit 38 reads one or a plurality of relay sub-payloads 23 from the relay sub-payload storage unit 33.

At Step S252, the frame transmission unit 38 adds one or a plurality of relay sub-payloads 23 to the end of the frame 20 being transmitted in the order of the furthest address to the closest address from the device of its own, so as to continue the transmission of the frame 20. This increases the length of the frame 20 being transmitted.

Figure 12:
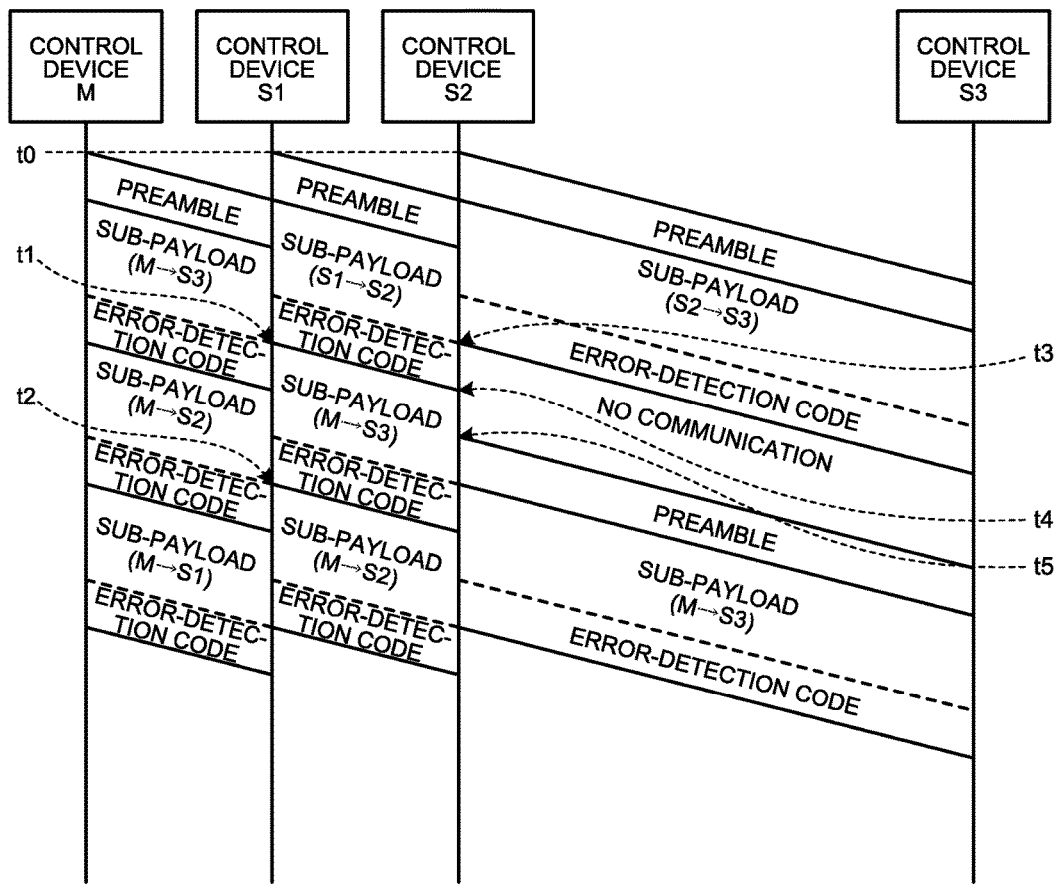
FIG. 12 is a sequence diagram illustrating a communicating operation of the communication system according to the first embodiment.

FIG. 12 is a sequence diagram illustrating a communicating operation of the communication system according to the first embodiment. The sequence diagram in FIG. 12 illustrates the operation of the communication system 1 during the period of performing the communication in the downstream direction 15.

At a timing t0, the control devices M, S1, S2, and S3 simultaneously start the communication in the downstream direction 15.

At the timing t0, the control device M starts transmitting the frame 20 to the control device S1, where the frame 20 includes the own-device issued sub-payload 23 addressed to the control device S3, the own-device issued sub-payload 23 addressed to the control device S2, and the own-device issued sub-payload 23 addressed to the control device S1.

The control device M transmits the frame 20 to the control device S1, in which the own-device issued sub-payload 23 addressed to the control device S3, the own-device issued sub-payload 23 addressed to the control device S2, and the own-device issued sub-payload 23 addressed to the control device S1 are combined in the order of the furthest address to the closest address from the control device M, that is, in the order of the control device S3, the control device S2, and the control device S1.

At the timing t0, the control device S1 starts transmitting to the control device S2 the frame 20 including the own-device issued sub-payload 23 addressed to the control device S2.

At the timing t0, the control device S2 starts transmitting to the control device S3 the frame 20 including the own-device issued sub-payload 23 addressed to the control device S3.

At a timing t1, the control device S1 finishes transmitting the own-device issued sub-payload 23 addressed to the control device S2. At this point in time, the control device S1 has started receiving the main portion 24 of the relay sub-payload 23 issued by the control device M and addressed to the control device S3. Therefore, the control device S1 adds this relay sub-payload 23, issued by the control device M and addressed to the control device S3, to the end of the frame 20 being transmitted, so as to increase the length of the frame 20 being transmitted, thereby continuing the transmission of the frame 20.

At a timing t2, the control device S1 finishes transmitting the relay sub-payload 23 issued by the control device M and addressed to the control device S3. At this point in time, the control device S1 has started receiving the main portion 24 of the relay sub-payload 23 issued by the control device M and addressed to the control device S2. Therefore, the control device S1 adds this relay sub-payload 23, issued by the control device M and addressed to the control device S2, to the end of the frame 20 being transmitted, so as to increase the length of the frame 20 being transmitted, thereby continuing the transmission of the frame 20.

At a timing t3, the control device S2 finishes transmitting the own-device issued sub-payload 23 addressed to the control device S3. At this point in time, the control device S2 has not yet finished receiving the main portion 24 of the relay sub-payload 23 issued by the control device M and addressed to the control device S3. Therefore, the control device S2 does not perform the communication until it finishes receiving the main portion 24 of the relay sub-payload 23 issued by the control device M and addressed to the control device S3. It is also possible that while not performing the communication, the control device S2 transmits a low-level or high-level signal to the control device S3.

At a timing t4, the control device S2 starts receiving the main portion 24 of the relay sub-payload 23 issued by the control device M and addressed to the control device S3. Therefore, at a timing t5, the control device S2 starts transmitting the frame 20 including the relay sub-payload 23 issued by the control device M and addressed to the control device S3.

As described above, according to the first embodiment, the control device S1 can transmit a single frame 20 including the own-device issued sub-payload 23 addressed to the control device S2, the relay sub-payload 23 issued by the control device M and addressed to the control device S3, and the relay sub-payload 23 issued by the control device M and addressed to the control device S2. That is, the control device S1 can reduce the number of frames 20 to be transmitted. In other words, the control device S1 can reduce the number of preambles. Therefore, the control device S1 can reduce the communication time by an amount corresponding to the reduction in number of preambles.

Further, according to the first embodiment, the control device M transmits the frame 20 to the control device S1, in which the own-device issued sub-payload 23 addressed to the control device S3, the own-device issued sub-payload 23 addressed to the control device S2, and the own-device issued sub-payload 23 addressed to the control device S1 are combined in the order of the furthest address to the closest address from the control device M, that is, in the order of the control device S3, the control device S2, and the control device S1. Therefore, the following effects are obtained.

It is assumed that the control device M transmits to the control device S1 the frame 20 in which the own-device issued sub-payload 23 addressed to the control device S1, the own-device issued sub-payload 23 addressed to the control device S3, and the own-device issued sub-payload 23 addressed to the control device S2, are combined in the described order. Under this assumption, the control device S1 cannot transmit the relay sub-payload 23 addressed to the control device S3 at the timing t1. That is, the control device S1 cannot start transmitting the relay sub-payload 23 addressed to the control device S3 until the control device S1 has received this relay sub-payload 23. Therefore, completion of the communication among the control devices M, S1, S2, and S3 is delayed, and this increases the communication time.

Meanwhile, according to the first embodiment, the control device M transmits to the control device S1 the frame 20 in which the own-device issued sub-payload 23 addressed to the control device S3, the own-device issued sub-payload 23 addressed to the control device S2, and the own-device issued sub-payload 23 addressed to the control device S1 are combined in the described order.

Therefore, according to the first embodiment, upon receiving the relay sub-payload 23 issued by the control device M and addressed to the control device S3, at the timing t1, the control device S1 can transmit to the control device S2 this relay sub-payload 23 issued by the control device M and addressed to the control device S3. Due to this operation, the completion of the communication among the control devices M, S1, S2, and S3 can be advanced forward, and this can reduce the communication time.

Further, it is assumed that the control device M transmits to the control device S1 the frame 20 in which the own-device issued sub-payload 23 addressed to the control device S2, the own-device issued sub-payload 23 addressed to the control device S3, and the own-device issued sub-payload 23 addressed to the control device S1, are combined in the described order. Under this assumption, the control device S2 cannot transmit the relay sub-payload 23 addressed to the control device S3 at the timing t4. That is, the control device S2 cannot start transmitting the relay sub-payload 23 addressed to the control device S3 until the control device S2 has received this relay sub-payload 23. Therefore, the completion of the communication among the control devices M, S1, S2, and S3 is delayed, and this increases the communication time.

Meanwhile, according to the first embodiment, the control device M transmits to the control device S1 the frame 20 in which the own-device issued sub-payload 23 addressed to the control device S3, the own-device issued sub-payload 23 addressed to the control device S2, and the own-device issued sub-payload 23 addressed to the control device S1 are combined in the described order. The control device S1 then transmits to the control device S2 the frame 20 including the own-device issued sub-payload 23 addressed to the control device S2, the relay sub-payload 23 addressed to the control device S3, and the relay sub-payload 23 addressed to the control device S2.

Therefore, according to the first embodiment, upon receiving the relay sub-payload 23 issued by the control device M and addressed to the control device S3, at the timing t4, the control device S2 can transmit to the control device S3 this relay sub-payload 23 issued by the control device M and addressed to the control device S3. Due to this operation, the completion of the communication among the control devices M, S1, S2, and S3 can be advanced forward, and this can reduce the communication time.

Further, according to the first embodiment, the control devices M, S1, S2, and S3 add the error-detection code portion 25 within the own-device issued sub-payload 23, thereby obtaining the following effects.

When the control devices S1 and S2 receive the relay sub-payload 23 from another device, while transmitting the frame 20 including the own-device issued sub-payload 23, the control devices S1 and S2 add this relay sub-payload 23 to the end of the frame 20 being transmitted. That is, the contents and the length of the frame 20 are dynamically changed.

In order to detect an error attributable to a transmission error, it is common to add a frame check sequence to the end of a frame at the time of creating the frame. However, before a certain device receives the frame to the end, this device completes transmission of the frame from its own station. Therefore, even though there is an error in the frame check sequence of the received frame, the device cannot notify the error.

Meanwhile, according to the first embodiment, the control devices M, S1, S2, and S3 add the error-detection code portion 25 within the own-device issued sub-payload 23. Therefore, a target-address device can refer to the error-detection code portion 25, and detect an error in the own-device addressed sub-payload 23.

It is also possible that the frame transmission unit 38 determines whether the frame 20 is being transmitted, based on the remaining length of the sub-payload 23 being transmitted. The frame transmission unit 38 reads the main portion 24 from the transmission-data storage unit 36, and reads the error-detection code portion 25 from the error-detection-code generation unit 37, to create the own-device issued sub-payload 23. The processing time required for the frame transmission unit 38 to create the own-device issued sub-payload 23 is represented as T0. When the transmission remaining time T1 is longer than the processing time T0, where the transmission remaining time T1 is obtained by dividing the remaining length of the sub-payload 23 being transmitted by a predetermined communication speed, the frame transmission unit 38 can determine that the frame 20 is being transmitted. Due to this operation, the frame transmission unit 38 can determine that the frame 20 is being transmitted, taking into account the processing time required to create the own-device issued sub-payload 23.

It is also possible that the frame transmission unit 38 determines whether the frame 20 is being transmitted, based on the transmission-start time-point and the length of the sub-payload 23 being transmitted. The frame transmission unit 38 can determine that the frame 20 is being transmitted when the scheduled transmission-completion time-point T4 is later than the time-point obtained by adding the processing time T0 to the present time-point, where the scheduled transmission-completion time-point T4 is obtained by adding the transmission time T2 to the transmission-start time-point T3 for the sub-payload 23 being transmitted, and where the transmission time T2 is obtained by dividing the length of the sub-payload 23 being transmitted by the communication speed. Due to this operation, the frame transmission unit 38 can determine that the frame 20 is being transmitted, taking into account the processing time required to create the own-device issued sub-payload 23.

Further, according to the first embodiment, the frame transmission unit 38 can determine whether the frame 20 is being transmitted, based on the remaining length of the sub-payload 23 being transmitted, or based on the transmission-start time-point and the length of the sub-payload 23 being transmitted.

When the transmission remaining time T1 is longer than the processing time T0 for creating the own-device issued sub-payload 23, where the transmission remaining time T1 is obtained by dividing the remaining length of the sub-payload 23 being transmitted by the communication speed, the frame transmission unit 38 can determine that the frame 20 is being transmitted.

Further, the frame transmission unit 38 can determine that the frame 20 is being transmitted when the scheduled transmission-completion time-point T4 is later than the time-point obtained by adding the processing time T0 to the present time-point, where the scheduled transmission-completion time-point T4 is obtained by adding the transmission time T2 to the transmission-start time-point T3 for the sub-payload 23 being transmitted, and where the transmission time T2 is obtained by dividing the length of the sub-payload 23 being transmitted by the communication speed.

Due to this operation, the frame transmission unit 38 can appropriately determine whether to add the sub-payload 23 to the end of the frame 20 being transmitted, taking into account the processing time for creating the own-device issued sub-payload 23.

Figure 13:
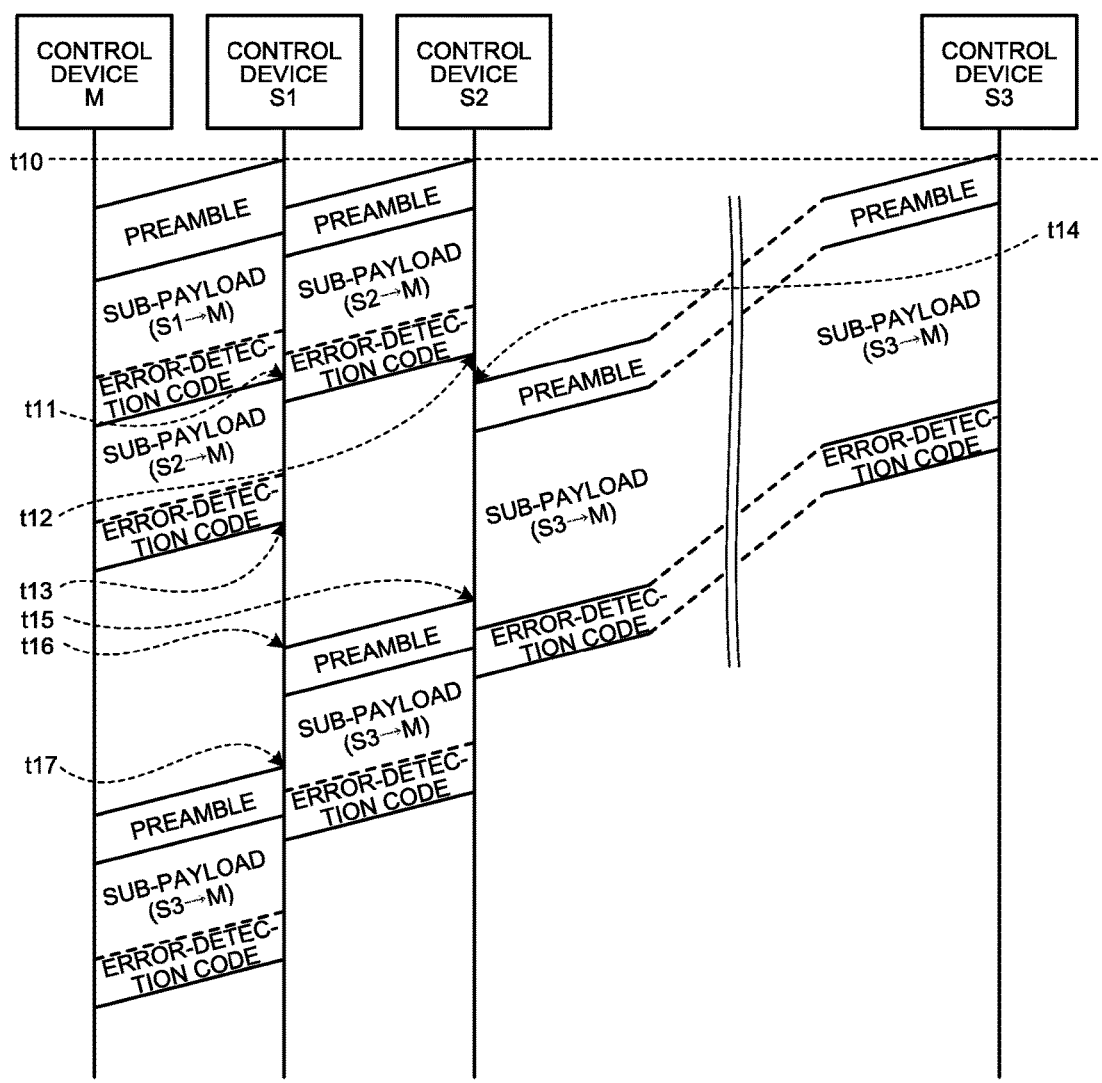
FIG. 13 is a sequence diagram illustrating a communicating operation of the communication system according to the first embodiment.

FIG. 13 is a sequence diagram illustrating a communicating operation of the communication system according to the first embodiment. The sequence diagram in FIG. 13 illustrates the operation of the communication system 1 during the period of performing the communication in the upstream direction 16.

At a timing t10, the control devices S1, S2, and S3 simultaneously start the communication in the upstream direction 16.

At the timing t10, the control device S1 starts transmitting to the control device M the frame 20 including the own-device issued sub-payload 23 addressed to the control device M.

At the timing t10, the control device S2 starts transmitting to the control device S1 the frame 20 including the own-device issued sub-payload 23 addressed to the control device M.

At the timing t10, the control device S3 starts transmitting to the control device S2 the frame 20 including the own-device issued sub-payload 23 addressed to the control device M.

At a timing t11, the control device S1 finishes transmitting the own-device issued sub-payload 23 addressed to the control device M. At this point in time, the control device S1 has started receiving the main portion 24 of the relay sub-payload 23 issued by the control device S2 and addressed to the control device M. Therefore, the control device S1 adds this relay sub-payload 23 issued by the control device S2 and addressed to the control device M, to the end of the frame 20 being transmitted, so as to increase the length of the frame 20 being transmitted, thereby continuing the transmission of the frame 20.

At a timing t12, the control device S2 finishes transmitting to the control device S1 the frame 20 including the own-device issued sub-payload 23 addressed to the control device M.

At a timing t13, the control device S1 finishes transmitting the frame 20 to the control device M, where the frame 20 includes the own-device issued sub-payload 23 addressed to the control device M, and the relay sub-payload 23 issued by the control device S2 and addressed to the control device M.

At a timing t14, the control device S2 starts receiving the relay sub-payload 23 issued by the control device S3 and addressed to the control device M. At a timing t15, the control device S2 starts transmitting a new frame 20 to the control device S1, where the frame 20 includes this relay sub-payload 23 issued by the control device S3 and addressed to the control device M.

At a timing t16, the control device S1 starts receiving the relay sub-payload 23 issued by the control device S3 and addressed to the control device M. At a timing t17, the control device S1 starts transmitting a new frame 20 to the control device M, where the frame 20 includes this relay sub-payload 23 issued by the control device S3 and addressed to the control device M.

As described above, according to the first embodiment, the following effects are obtained.

It is common that the maximum frame length is defined with respect to the communication physical layer. It is assumed that the control device S1 combines the own-device issued sub-payload 23 addressed to the control device M, the relay sub-payload 23 issued by the control device S2 and addressed to the control device M, and the relay sub-payload 23 issued by the control device S3 and addressed to the control device M, into a single frame 20. Under this assumption, the length of the frame 20 may exceed the maximum frame length.

Meanwhile, according to the first embodiment, when the control device S1 receives the relay sub-payload 23 issued by the control device S2 and addressed to the control device M, while transmitting the frame 20 including the own-device issued sub-payload 23 addressed to the control device M, the control device S1 adds this relay sub-payload 23 issued by the control device S2 and addressed to the control device M, to the end of the frame 20 being transmitted, so as to increase the length of the frame 20 being transmitted, thereby continuing the transmission of the frame 20.

On the other hand, even if the control device S1 receives the frame 20 including the relay sub-payload 23 issued by the control device S3 and addressed to the control device M, while transmitting the relay sub-payload 23 issued by the control device S2 and addressed to the control device M and when this length of the frame 20 being transmitted exceeds the maximum frame length, the control device S1 does not increase the length of the frame 20 being transmitted, but the control device S1 transmits a new frame 20 to the control device M, where the frame 20 includes the relay sub-payload 23 issued by the control device S3 and addressed to the control device M.

Therefore, according to the first embodiment, the control device S1 can achieve both reduction in the communication time by an amount corresponding to the reduction in number of preambles, and prevention of the frame 20 from exceeding the maximum frame length. The reduction in the communication time is achieved by means of adding the relay sub-payload 23 issued by the control device S2 and addressed to the control device M, to the end of the frame 20 including the own-device issued sub-payload 23 addressed to the control device M. The prevention of the frame 20 from exceeding the maximum frame length is achieved by means of transmitting a new frame 20 including the relay sub-payload 23 issued by the control device S3 and addressed to the control device M.

Further, according to the first embodiment, the control device S1 does not transmit the idle-time data from the timing t13 to a timing t17, differently from the technique described in Patent Literature 3. Therefore, an effect is obtained where the control device S1 does not need to be configured to create the idle-time data.

The configuration described in the embodiment described above is an example of the contents of the present invention. The configuration can be combined with other publicly known techniques, and a part of the configuration can be omitted or modified without departing from the scope of the present invention.

REFERENCE SIGNS LIST

1 communication system
M, S1, S2, S3 control device
Ma, S1a, S2a, S3a communication unit
31 frame reception unit
32 error detection unit
33 relay sub-payload storage unit
34 communication-start notification unit
35 preamble storage unit
36 transmission-data storage unit
37 error-detection-code generation unit
38 frame transmission unit

The invention claimed is:

1. A communication device, which transmits and receives at least one frame comprising a preamble and a payload, the communication device comprising:
a frame receiver, which receives a reception frame from among the at least one frame, from another device from among a plurality of other devices, wherein the payload of the reception frame comprises a plurality of sub-payloads, each of which includes a main portion comprising an address portion storing a value that indicates a target-address device from among the communication device and the plurality of other devices, a data portion comprising data to be transmitted to the target-address device, and a data-length portion comprising a value indicating a length of the data portion, and an error-detection code portion comprising an error-detection code for performing error detection attributable to a transmission error, and which separates the reception frame into a relay sub-payload, from among the plurality of sub-payloads, wherein the relay sub-payload is not addressed to the communication device, and an own-device addressed sub-payload, from among the plurality of sub-payloads, wherein the own-device addressed sub-payload is addressed to the communication device;
an error detector, which is at least one processor, which performs an error detection on the own-device addressed sub-payload based on the error-detection code in the own-device addressed sub-payload;
a relay sub-payload storage unit, which is a memory, which stores the relay sub-payload;
a communication-start notifier, which is said at least one processor, which notifies of a communication-start timing to start communication simultaneously with the plurality of other devices; and
a frame transmitter, which starts transmitting to one of the plurality of other devices a transmission frame, from among the at least one frame, comprising the preamble and the relay sub-payload in response to being notified, by the communication-start notifier, of the communication-start timing, and which, in response to the relay sub-payload storage unit storing the relay sub-payload, adds the relay sub-payload to an end of the transmission frame being currently transmitted, so as to continue transmission of the transmission frame,
wherein the communication device and the plurality of other devices are factory automation (FA) devices and comprise a programmable logic controller and a plurality of slave devices connected via a daisy chain with each other such that communication between at least some of the of the FA devices are performed only via other ones of the FA devices.

2. The communication device of claim 1, wherein the own-device addressed sub-payload is located last in the payload from among the plurality of sub-payloads and wherein the frame transmitter starts transmitting a beginning portion of the transmission frame while generating an ending portion of the transmission frame.

3. The communication device of claim 1, wherein the transmission frame is formed such that the plurality of sub-payloads are combined into the payload in an order of furthest address to closest address from the communication device.

4. The communication device of claim 1, wherein each of the plurality of sub-payloads comprises the error-detection code uniquely generated by a respective device from among the communication device and the plurality of other device.

5. A communication method of transmitting and receiving at least one frame by a communication device, each of the at least one frame comprising a preamble and a payload, the communication method comprising:
receiving a reception frame, from among the at least one frame, from another device from among a plurality of other devices, wherein the payload of the reception frame comprises a plurality of sub-payloads, each of which includes a main portion comprising an address portion storing a value that indicates a target-address device from among the communication device and the plurality of other devices, a data portion comprising data to be transmitted to the target-address device, and a data-length portion comprising a value indicating a length of the data portion, and an error-detection code portion comprising an error-detection code for performing error detection attributable to a transmission error,
separating the reception frame into a relay sub-payload, from among the plurality of sub-payloads, wherein the relay sub-payload is not addressed to the communication device, and an own-device addressed sub-payload, from among the plurality of sub-payloads, that is addressed to the communication device;
performing an error detection on the own-device addressed sub-payload based on the error-detection code in the own-device addressed sub-payload;
storing the relay sub-payload in a memory;
notifying a communication-start timing to start communication simultaneously with the plurality of other devices; and
starting transmitting to one of the plurality of other devices a transmission frame, from among the at least one frame, comprising the preamble and the relay sub-payload in response to being notified of the communication-start timing, and in response to detecting the relay sub-payload in the memory, adding the relay sub-payload to an end of the transmission frame currently being transmitted, so as to continue transmission of the transmission frame,
wherein the communication device and the plurality of other devices are factory automation (FA) devices and comprise a programmable logic controller and a plurality of slave devices connected via a daisy chain with each other such that communication between at least some of the of the FA devices are performed only via other ones of the FA devices.

* * * * *